(No Model.) 3 Sheets—Sheet 1.

C. C. GALE, R. COWLES & A. W. DAVIES.
CAR MILEAGE REGISTER.

No. 456,650. Patented July 28, 1891.

WITNESSES
Loren Prentiss
B. M. Jones

INVENTORS
Charles C. Gale,
Royal Cowles,
Alexander W. Davies,
by _____ ATTORNEY (No Model.) 3 Sheets—Sheet 2.
C. C. GALE, R. COWLES & A. W. DAVIES.
CAR MILEAGE REGISTER.

No. 456,650. Patented July 28, 1891.

WITNESSES
M. B. Vorce
L. Prentiss

INVENTORS
Charles C. Gale
Royal Cowles
Alexander W. Davies
by C. M. Vorce Atty (No Model.) 3 Sheets—Sheet 3.
C. C. GALE, R. COWLES & A. W. DAVIES.
CAR MILEAGE REGISTER.
No. 456,650. Patented July 28, 1891.
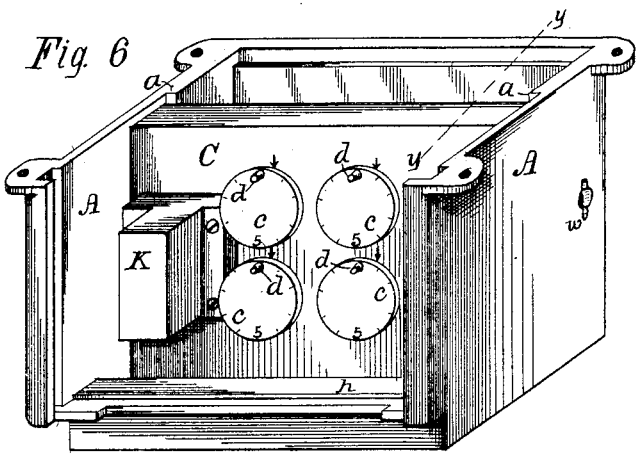
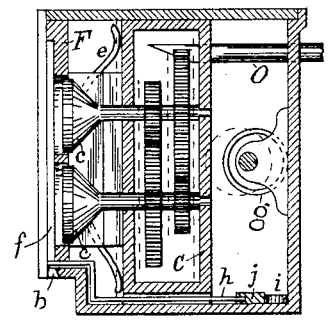
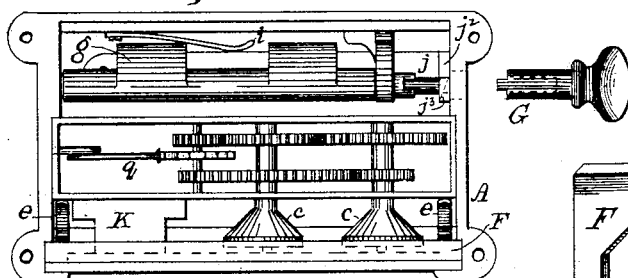
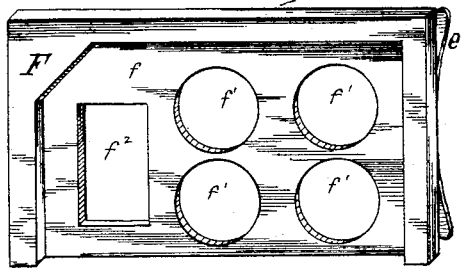
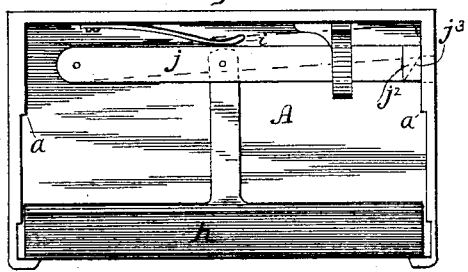
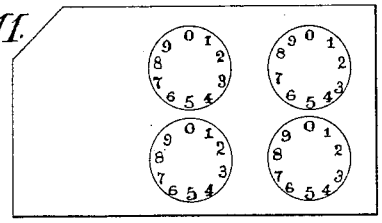
Witnesses:
M. B. Vorce
L. Prutiss
Inventors:
Charles C. Gale,
Royal Cowles,
Alexander W. Davies
by C. M. Vorce Att'y.
THE NORRIS PETERS CO., PHOTO-LITHO., WASHINGTON, D. C.

UNITED STATES PATENT OFFICE.

CHARLES C. GALE, ROYAL COWLES, AND ALEXANDER W. DAVIES, OF CLEVELAND, OHIO, ASSIGNORS TO SAID GALE AND SAID DAVIES AND EDWARD C. GARLICK AND CARL C. HARRIS, OF SAME PLACE.

CAR-MILEAGE REGISTER.

SPECIFICATION forming part of Letters Patent No. 456,650, dated July 28, 1891.

Application filed July 12, 1890. Serial No. 358,537. (No model.)

*To all whom it may concern:*

Be it known that we, CHARLES C. GALE, ROYAL COWLES, and ALEXANDER W. DAVIES, citizens of the United States, residing at Cleveland, in the county of Cuyahoga and State of Ohio, have invented certain new and useful Improvements in Car-Mileage Indicators and Registers; and we do hereby declare the following to be a full, clear, and exact description of the invention, such as will enable others skilled in the art to which it appertains to make and use the same.

The object of our invention is to provide means whereby the mileage of a railway-car may be automatically indicated and registered and the indicated mileage may be at any time recorded upon removable record-slips with such other information as may be desired; and the invention consists in a mileage-meter and registering mechanism inclosed in a suitable case and attached to the car and so connected by suitable mechanism with the running-gear of the car that the rotation of the car-axle, operating on such connecting mechanism, actuates the multiplying gears constituting the mileage-meter, and thus indicates and registers the mileage, while such indicating mechanism is capable of being made at any time to impress upon suitable record-slips introduced and brought in contact therewith the mileage indicated and other desirable information.

Figure 1:
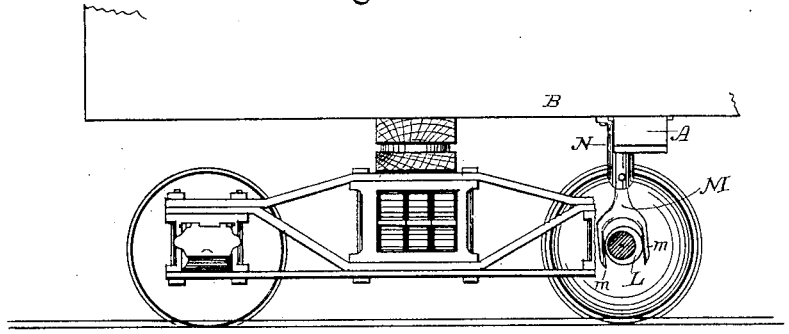
Figure 2:
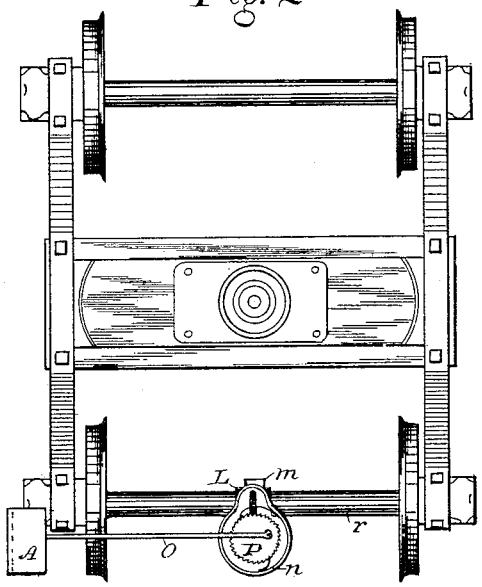
Figure 3:
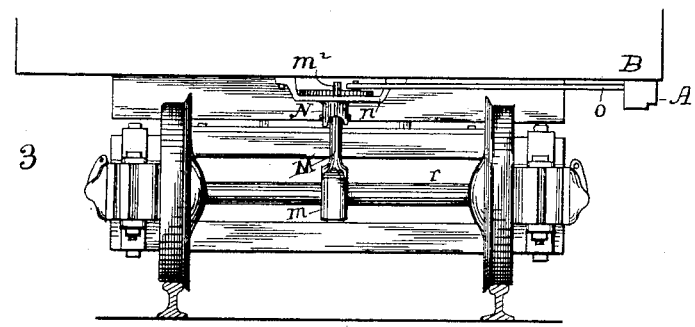
Figure 4:
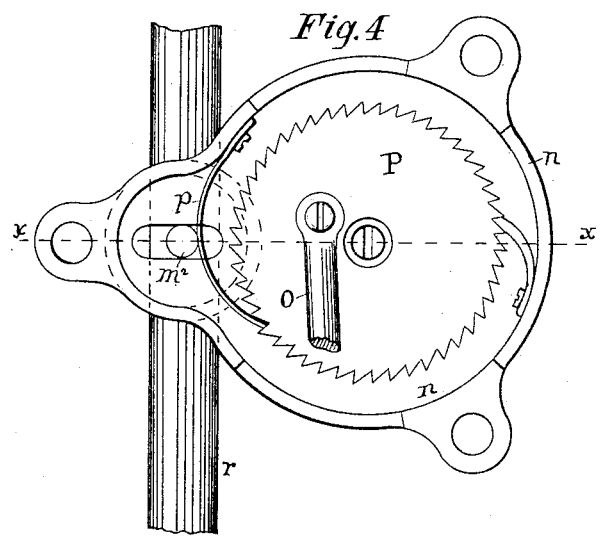
Figure 5:
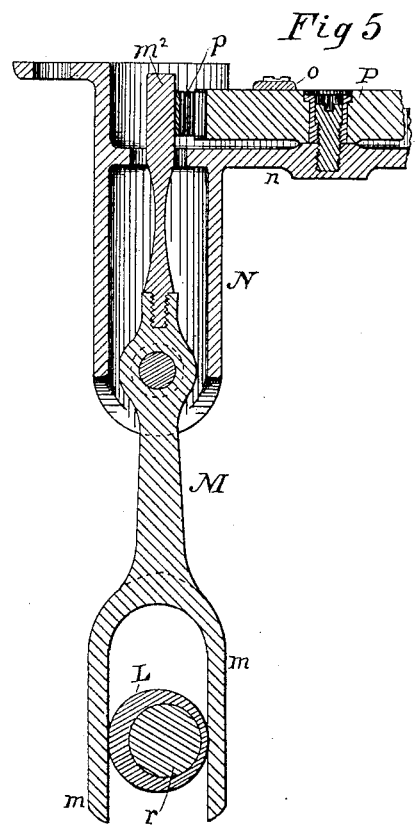
Figure 13:
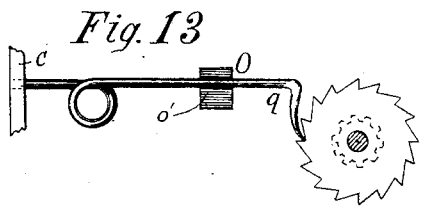

Figure 1 is a view in elevation of our device as attached to a railway-car, a portion of the truck and one of the wheels being broken away to afford a clearer view. Fig. 2 is a plan view of the car-truck and mileage-meter with their connections. Fig. 3 is an elevation at right angles to Fig. 1, showing the preferred mode of connecting the meter with the car-axle by means of a cam on the axle and a lever attached to the car-body. Fig. 4 is a plan view of the ratchet-case and connections by which the lever operated by the cam is made to actuate the meter. Fig. 5 is a vertical central section on the line $x\ x$ of the lever and mechanism shown in Fig. 4. Fig. 6 is a perspective view of the meter in position in its case with the top and front of the case removed. Fig. 7 is a sectional view on the line $y\ y$ of Fig. 6. Fig. 8 is a plan view of the meter and case with the top of the meter and of the case removed. Fig. 9 is a perspective view of the partition containing the recess for the record-slip. Fig. 10 is a plan view of the case with the meter, cam, and partition removed to show the guard-lock. Fig. 12 is a detached view of the end of the wedge-pawl actuating the meter, and Fig. 13 a detached view of the spring-pawl actuated by the wedge-pawl. Fig. 11 shows the record-slip.

In applying our invention to railway-cars we arrange a train of multiplying gears so as to constitute a counting mechanism or odometer of the usual kind, employing as many wheels as may be required to give the desired extent of notation, and arranging the same in compact form so as to be inclosed in a rigid case or frame, which in turn is inclosed in an outer case A, which we prefer to attach to the under side of the car-sill slightly back from its outer edge in order to be out of the way and yet convenient of access. The operating mechanism we prefer to attach to the car-sill over the axle, and we find that an efficient mechanism for the purpose is a vertical lever whose lower end rides on a cam on the car-axle and whose upper end actuates by its oscillation a ratchet-disk secured beneath the car-sill, to which disk the wedge-pawl of the meter is eccentrically attached.

Referring now to the drawings, A represents the case containing the counting and registering mechanism, secured to the sill B of a car.

C is the case or frame containing the meter, which is fitted to slide a short distance in the case A in the direction of the actuating-pitman, but is normally held back by a spring against fixed stops $a\ a$ on the outer case A. The pinions of the counting-wheels of the meter extend through the front of the frame C, and to the outer end of each is affixed an arm, or preferably a dial $c$, on the periphery of which is a projecting point $d$, adapted to perforate or impress the record-slip, as hereinafter described.

The dials $c\ c$ may be graduated or numbered as dials usually are and read from a fixed index on the meter-frame, or the numbers or graduation may surround the dial on the meter-frame and the points $d\ d$ serve as the indices to read the meter, it not being essential which method is adopted, as the reading of the meter-dials is merely ancillary to our invention.

In front of the dials $c\ c$, when held back in their normal position by the spring $e$, space is provided for the insertion into the case A of a record-slip of paper, card-board, or other suitable material, and to prevent the record-slip from catching on the dials or points $d\ d$ while being inserted a partition F is placed in front of the dials in such position that the points $d$, when the meter is retracted by the spring $e$, do not project beyond the face of the partition. Openings corresponding to the dials $c$ are left in the partition through which the dials pass when the meter is forced forward by the cam $g$, and in the face of the partition a recess $f$ is formed to receive the record-slip when inserted, for which purpose an opening $b$ is provided in the case A at a suitable point.

Back of the meter-case C is arranged a cam $g$, with its shaft fitted to receive a key G, adapted to engage the shaft of the cam and turn the same. The shaft of the cam may extend to the outside of the case A, but we prefer to terminate the same within the case, and to provide a key-hole $w$ through which the key may be inserted to turn the cam. This is to prevent the cam and meter from being meddled with by unauthorized persons. For the same purpose and also to exclude dust we arrange a sliding plate $h$, which covers the opening $b$ and is held in position by a spring $i$, acting on the lever $j$, to which the plate $h$ is pivoted. A second lever $j^2$ is pivoted at one end to the inside of the case A, extending across the key-hole like an escutcheon, and at its other end engages the free end of the lever $j$, an inclined face $j^3$ on this lever $j^2$ opposite the key-hole causes the same to turn aside when the key G is inserted, and thereby to move the lever $j$ and draw back the sliding plate $h$ to permit the insertion of the record-slip. The cam $g$, when turned, forces forward the meter-frame C, as shown by dotted lines in Fig. 7, causing the dials to protrude through the partition F and the points $d$ to puncture or impress the record-slip which has been inserted, to facilitate which it is desirable, although not essential, to place a smooth elastic lining—such as rubber or leather—on the inner surface of the case A, against which the record-slip is forced during the impression. When the cam is turned so as to relieve its pressure on the meter-frame the spring $e$ throws back the latter against the stops $a\ a$, and the partition F strips off the record-slip from the points $d$ in case they have penetrated through the slip, and allows the slip to be withdrawn. Numbered or graduated dials, corresponding in size and position to the dials $c\ c$, are printed on the record-slip, and the location thereon of the punctures or impressions made by the points $d\ d$ gives the reading of the mileage on the record-slip.

K is a block or projection on the frame C, on which block a type-plate containing any desired matter—such as the number of the car, its size, ownership, style, &c., is to be affixed projecting in the same vertical plane as the points $d$, and consequently impressing the record-slip in the same manner when the cam $g$ is revolved.

The actuating of the meter is effected by means of a wedge-pawl O, which enters the case A in a direction in line with, or substantially so, the throw of the cam $g$. The wedge-pawl is formed with a wedge face $o'$ at its inner end, which, as it is moved forward, forces down the spring-pawl $q$, which moves the first wheel of the meter. The amount of motion effected by the wedge-pawl at each stroke is of course so adjusted with reference to the number of teeth in the various wheels as to insure the correct registration by the meter of the number of miles run, which adjustment is effected by the proportions of the various parts of the mechanism which connects the meter with the axle in their relation to the dimensions of the wheel.

L represents the cam on the car-axle.

M is the lever for converting the motion of the axle into a reciprocating motion. The lower end of this lever may be divided into the forks $m\ m$, which are expanded laterally, as shown in Fig. 3, in order that the oscillation of the car on its springs may not throw the lever off the cam or the cam itself may be extended. The face of the cam or lever is rounded to reduce friction.

N is a sleeve in which the upper end of the lever M plays and at the lower end of which it is pivoted. The upper part of the sleeve is expanded into a shallow box $n$, within which is pivoted a ratchet-disk P, which, by means of a spring-pawl P, receives motion from the oscillating upper end $m^2$ of the lever M, being so adjusted as to move a definite distance with each stroke of the lever. To the ratchet-disk P the wedge-pawl O is eccentrically pivoted and is actuated thereby.

It is essential that the mechanism by which the rotation of the car-axle is caused to actuate the meter should be such as to constantly actuate the meter while the car is in motion, no matter in which direction it moves.

It is obvious that any movement of the car, however slight, will cause the meter to register, as the ratchet-disk moves only one way, whichever way the axle turns.

In operating our invention the procedure is as follows: When first attached to the car, the meter is set with all its dials at zero or on any determinate number, which is noted. At any time afterward when it is desired to ascertain the mileage of the car it is only necessary to insert the key, which action withdraws the guard-plate covering the opening $b$. Then to insert the record-slip into its recess, turn the key, which causes the cam to force the meter-frame forward and impress upon the record-slip the type-plate and dial-points. Then to reverse the movement, withdraw the record-slip, and finally withdraw the key, allowing the guard-plate and its levers to close all the openings. The location of the marks made on the record-slip by the dial-points indicates the miles the car has run by comparison with the original setting of the meter or a previous intermediate record of the mileage. As a means of insuring the correct position of the record-slip when inserted for impression, we prefer to form the same of rectangular form, notched on one edge or one corner, and to form the recess for its reception of the same shape, as shown in Fig. 9, so that the slip cannot be fully inserted in any other than the correct position.

The record-slip is not claimed in this specification, being reserved as the subject of a separate application filed concurrently herewith, and is shown merely to illustrate the operation of the invention herein claimed.

What we claim as our invention, and desire to secure by Letters Patent, is—

1. A car-mileage indicator and register consisting of a mileage-meter adapted to be secured to a railway-car and to impress upon a record-sheet, when brought in contact therewith, the mileage indicated by such meter, mechanism connecting said meter operatively with the car-axle, and mechanism, substantially such as described, for causing said meter to impress at any desired time the mileage then indicated thereby upon removable record-slips, substantially as described.

2. A car-mileage indicator and register consisting of the following elements in combination, to wit: a mileage-meter adapted to be secured to a railway-car, a ratchet-disk operatively connected with the car-axle and actuated by the rotation thereof in either direction, and a wedge-pawl attached to said disk and actuating said meter, whereby the rotary motion of the car-axle in either direction will operate the meter and cause the same to register the mileage of the car, substantially as described.

3. A car-mileage indicator and register consisting of a meter adapted to be secured to the car-body, mechanism for causing the rotation of the car-axle to operate said meter and register the mileage of the car, and mechanism for causing said meter at any desired time to impress upon removable record-slips having preformed symbols thereon, marks, or characters expressing the mileage indicated by said meter at the time of taking such impression, substantially as described.

4. A car-mileage indicator and register consisting of a counting-meter adapted to be secured to a railway-car and having points or projections adapted to impress a record-sheet, means for causing the motion of the car-axle to operate said meter, and means for forcing said meter into contact with a record-sheet at any desired time and causing such projections to impress the same, substantially as described.

5. A car-mileage indicator and register consisting of a meter inclosed in a case, adapted to be secured to a car, in combination with mechanism for causing the revolution of the car-axle to operate said meter, projections on said meter adapted to impress a record-sheet, and a cam for forcing the record-sheet and the meter into contact when desired to form the impression, substantially as described.

6. In a car-mileage indicator and register, the combination of a meter inclosed in a case, secured to a car, mechanism, substantially such as described, for causing the revolution of the car-axle to operate the meter, projections on said meter adapted to impress a record-sheet, a cam for forcing the meter and record-sheet into contact, and a key for actuating said cam, substantially as described.

7. In a car-mileage indicator and register, the combination of a cam on the car-axle, a lever actuated by said cam, a wedge-pawl operated by the motion of said lever, and a meter actuated by said wedge-pawl and adapted to register the mileage of the car, substantially as described.

8. The combination of a mileage-meter secured to a railway-car and having limited motion, a cam on the car-axle, the lever actuated thereby, and by its oscillation operating said meter, projections on said meter adapted to impress a record-sheet, and a cam adapted to force said meter and record-sheet into contact, substantially as described.

9. The combination of the mileage-meter adapted to be secured to a car and having limited motion, a cam on the car-axle, a lever actuated by said cam and by its oscillation operating rotatively a disk, imparting motion to the wedge-pawl of said meter, points or projections on said meter, and a cam for moving said meter, substantially as described.

10. The combination, with the meter adapted to be secured to the car, the cam on the car-axle, and the lever actuated thereby, of the ratchet-disk secured to the car, the spring-pawl for causing said lever to rotate the disk, and the wedge-pawl eccentrically pivoted to said ratchet-disk and actuating said meter, substantially as described.

11. In a car-mileage indicator and recorder, the combination, with the mileage-meter attached to a railway-car, and means for causing the rotation of the car-axle to operate said meter, of dies or type-plates adapted to impress a record-sheet simultaneously with the mileage-indicators of the meter, and a cam or equivalent means for forcing the meter and dies into contact with the record-sheet, substantially as described.

12. In a car-mileage indicator and recorder, the combination, with the mileage-meter secured to a railway-car, and means for causing the rotation of the car-axle to operate the same, of the containing-case adapted to have a record-slip removably inserted therein, the cam for moving the counting mechanism and its frame to impress the record-sheet, and a spring to restore the meter to its position and allow the record-sheet to be withdrawn, substantially as described.

13. In a car-mileage indicator and register, the combination, with the mileage-meter and its case, of the partition containing a recess adapted to receive the record-sheet in one position only and having openings within which the projections on the meter are normally retained to prevent their obstructing the insertion of the record-sheet, substantially as described.

14. In a car-mileage indicator and register, the combination, with the mileage-meter and its case, of the guard-plate normally closing opening in said case for insertion of the record-sheet and adapted to be retracted by the insertion of a key, substantially as described.

In testimony whereof we affix our signatures in presence of two witnesses.

CHARLES C. GALE.
ROYAL COWLES.
ALEXANDER W. DAVIES.

Witnesses:
MARY SNYDER,
WM. G. TAYLOR.